May 15, 1962 M. B. RODIN ET AL 3,034,978
REACTOR HAVING NaK-UO₂ SLURRY HELICALLY POSITIONED
IN A GRAPHITE MODERATOR
Filed Jan. 5, 1961 2 Sheets-Sheet 1

INVENTORS
Max B. Rodin
Joseph C. Carter
BY

Attorney

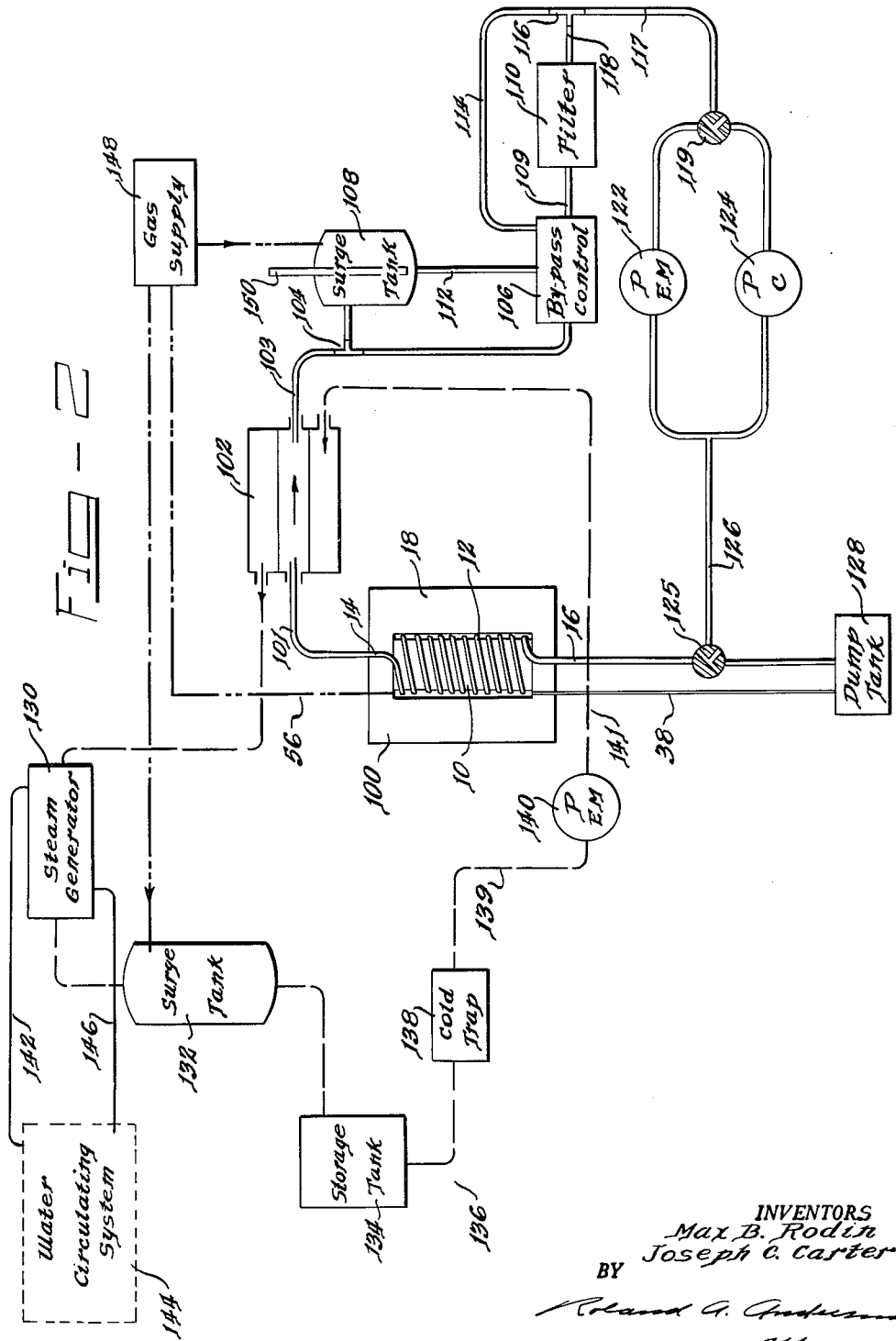

United States Patent Office 3,034,978
Patented May 15, 1962

3,034,978
REACTOR HAVING NaK—UO₂ SLURRY HELICALLY POSITIONED IN A GRAPHITE MODERATOR
Max B. Rodin, Park Forest, and Joseph C. Carter, Elmhurst, Ill., assignors to the United States of America as represented by the United States Atomic Energy Commission
Filed Jan. 5, 1961, Ser. No. 80,962
4 Claims. (Cl. 204—193.2)

The present invention relates to neutronic reactors and particularly to research and experimental reactors and reactors designed for teaching the reactor art.

Most reactors of the present class require the use of uranium which is very highly enriched in the fissionable isotope of uranium, $U^{235}$. In the present condition of the world there is some hazard in making such highly enriched uranium available generally to institutions unwilling or unable to safeguard such highly enriched material.

Further, most present research and teaching facility reactors require rigid fuel elements that are difficult to produce in satisfactory form and are therefore correspondingly expensive.

It is an object of this invention to produce a research and experimental reactor using a liquid fuel, flowing through a spiral tube system, giving up its heat to an outside heat exchanger.

It is also an object of this invention to provide a reactor having its nuclear fuel contained in an envelope of high integrity and reliability, by the use of a coil of seamless tubing made from a single length of tubing.

It is further an object of this invention to provide a reactor of simple design that can be disassembled either in whole or in part by lifting each element of the reactor from the assembly.

A further object of the invention, in one of its modifications is to provide moderator elements that do not become radioactive in use, thus simplifying handling, storage and disposal of these parts.

It is also an object of this invention to utilize the "flux trap" concept in a research reactor by having internal and external reflectors. The "flux trap" concept takes advantage of a central moderator block to concentrate neutron flux by virtue of the slowing down reaction, whereby neutrons enter at a given rate and exit at a much lower rate.

It is another objective of this invention to provide a reactor design suitable for power generation in remote locations, easily transported by air, as well as a reactor suitable for experimental and teaching use.

The invention is best described in conjunction with the figures described below.

FIGURE 2 is a schematic drawing of the reactor system as a whole including the reactor proper and the necessary accessory equipment.

Figure 1:
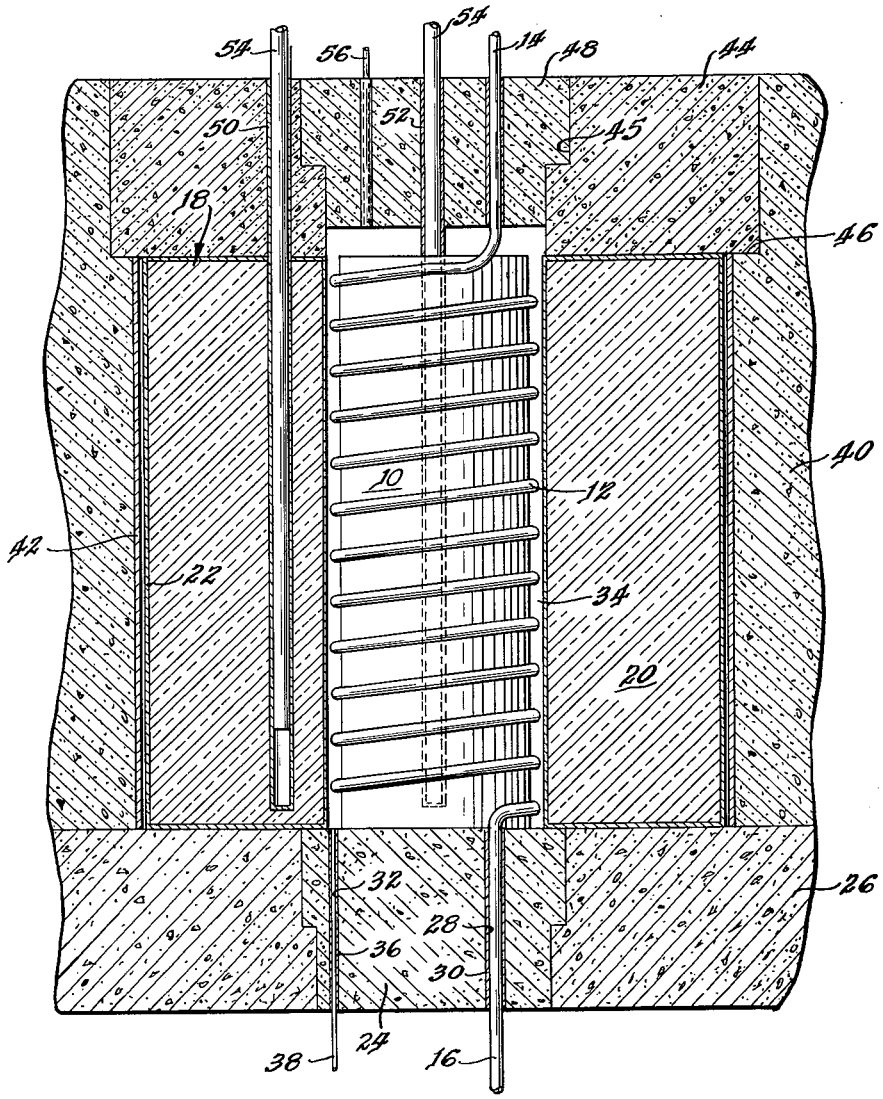
FIGURE 1 is a vertical view, partly in elevation and partly in cross section, of the reactor proper.

Referring to FIGURE 1, there is a central moderator-reflector block 10 of graphite, in cylindrical form having a height of 54" and a diameter of 18". Around this block 10 there is wound a helix 12 of seamless stainless steel tubing 1⅜" O.D., thickness 0.015". The between turn spacing of helix 12 is 4½" centerline to centerline of adjoining tube sections. There is ¹⁄₁₆" clearance between block 10 and helix 12. At the top of helix 12, outlet tube 14 extends upwardly at a right angle; inlet tube 16 extends downwardly from the bottom of helix 12, also at a right angle.

Encircling block 10 and helix 12 is the outer moderator-reflector cylinder 18, in the form of a hollow cylinder 54" high, 54" O.D. and 21" I.D. Cylinder 18 is a hollow cylinder of high purity graphite 20 encased in a hermetically sealed envelope of stainless steel 22, ¹⁄₁₆" thick.

The central block 10 rests on a bottom reflector plug 24 about 20" thick, 24" in diameter for the top 10" and 20" in diameter at the bottom. This plug is inserted into the base 26 of high density concrete, which has a central cavity to conform to plug 24. Plug 24 has a first opening 28 with a stainless steel liner 30, to accommodate inlet tube 16. A second opening 32 in plug 24 is positioned in line with an annular gap 34 between the central block 10 and the outer cylinder 18. A second stainless steel insert 36 conforms closely to opening 32, and allows the insertion of dump line 38 to drain gap 34 if needed.

Biological shield 40 is a cylinder of high density barytes concrete 36" thick, resting on base 26, and reaching a height of 36" above the top of cylinder 20. The top of shield 40 is of larger inner diameter at a point 54" above the base 26. A liner 42 of 1" mild steel fits the inside of biological shield 40, and acts as a thermal shield.

The first top shield 44, of barytes concrete, of thickness 36", reinforced with steel rests on shoulder 46 of biological shield 40. Shield 44 has a central opening 45, 26" in diameter for the top 18" and 21" through the lower 18". Into this opening is positioned top plug 48, of barytes concrete 30" thick, conforming in shape to the opening in top shield 44.

Three outer control rod thimbles 50, consisting of stainless steel tubes 1¾" O.D., 88" long with ³⁄₃₂" wall thickness, penetrate the first top shield 44, the envelope 22 and the upper 52" of the reflector cylinder 18, positioned equally about a 29" circle. A fourth thimble 52 having the same dimensions, penetrates the top plug 48 and the same length of central block 10. Four poison rods 54 of 304 stainless steel modified to contain 2% boron, 1½" in diameter and 8 feet long are fitted into thimbles 50 and 52. The central rod 54 acts as a control rod for the reactor, the remaining three rods 54 are safety rods. These are moved up and down by suitable mechanisms, not shown, responsive to the neutron flux level of the reactor. A gas inlet tube 56 penetrates plug 48 only.

Next, referring to FIGURE 2, the previously described assembly is here numbered 100. Outlet tube 14 is connected by means of tube 101 to heat exchanger 102. The outlet tube 103 from heat exchanger 102 connects to T 104. One connection to T 104 connects with a by-pass control 106, a system of valves which allows a preselected proportion of the flow to pass through along this path. The remaining portion of the flow passes from T 104 to surge tank 108. A tube 109 from by-pass control 106 connects to filter 110, capable of removing solid particles from the stream. A line 112 connects surge tank 108 to by-pass control 106. Another line 114 leaves by-pass control 106 which is connected to T 116. A second opening of T 116 receives line 118 which connects to filter 110. This assembly completes the by-pass system.

Surge tank 108 is 6" inside diameter, 12" long. This is intentionally small to minimize inventory of fissionable material and to eliminate the hazard of criticality if accidentally moderated by flood or similar accident. The drawing is out of scale for convenience of illustration.

A line 117 also connects from T 116 to an electromagnetic pump 122, through three way valve 119. A third connection to valve 119 passes to a canned rotor pump 124, which is reserved for emergency use. Both pumps, 122 and 124, are connected to a second three way valve 125 by a line 126. One outlet of valve 125 is connected to spiral outlet 16; the second outlet connects to a dump tank 128.

This dump tank 128 is an elongated cylinder 6" in diameter 60" long, made of stainless steel containing 2% by weight of boron. It is encased in concrete containing 10% boric acid to eliminate criticality hazards from accidental flooding. The drawing of dump tank 128 is schematic only.

A secondary circuit through heat exchanger 102, for passage of liquid sodium-potassium alloy, acting as a heat transfer medium is connected on one side to steam generator 130. The coolant outlet from steam generator 130 is connected to surge tank 132, which in turn is connected to storage tank 134. Inlet line 136 to storage tank 134 permits replenishment of sodium-potassium alloy, if needed. An outlet line from storage tank 134 passes through cold trap 138, which is kept cold to remove oxides from the sodium-potassium alloy. A line 139 from cold trap 138 passes to an electromagnetic pump 140, which provides circulation for the alloy. A line 141 connects electromagnetic pump 140 to heat exchanger 102, completing the coolant circuit.

Steam outlet line 142 carries steam from generator 130 to its position of use, shown schematically by 144. Water returns by way of return line 146.

An inert gas supply 148 is connected to primary surge tank 108, surge tank 132, and the annular gap 34 of reactor 100, to keep a protective atmosphere in these elements. A "getter" rod 150, preferably of clean uranium metal, is inserted into the primary surge tank 104, to maintain reducing conditions therein, by reaction with the oxides in the alkali metal. Stirring means, not shown, are provided in surge tank 108 to maintain the slurry in suspension during inactive periods.

The system is then charged with $UO_2$—NaK slurry, made by dispersing $UO_2$ in a sodium-potassium alloy, preferably by the method of Abraham and Flotow, U.S. patent application S.N. 541,316, now Patent No. 2,982,708, issued May 2, 1961. For each 1000 cubic inches of slurry needed 28.36 kilograms of $UO_2$ is dispersed in 840 cubic inches of NaK alloy. The $UO_2$ is highly purified to be substantially free of elements having a high thermal neutron capture cross section and the uranium therein is enriched to contain 20 atom percent of $U^{235}$. For the present system 1700 cubic inches are required. This amount fills the primary surge tank to about 60% of its capacity. If piping needs to be lengthened or larger lines used, the amount must be increased accordingly. The compounding of the slurry and its transfer to the reactor system must be accomplished in the absence of air or other reactive gases.

Physical parameters of the reactor core have been determined to be as follows.

| | |
|---|---|
| Fast fission factor ($\epsilon$) | 1.02. |
| Resonance escape probability ($p$) | 0.855. |
| Thermal utilization factor ($f$) | 0.756. |
| Neutrons emitted per capture ($\eta$) | 1.7. |
| Infinite multiplication factor ($k_\infty$) | 1.128. |
| Diffusion area ($L^2$) | 134 cm.$^2$. |
| Neutron age ($\tau$) | 405 cm.$^2$. |
| Fraction of reactivity in safety rods ($\Delta K$) | 18%. |
| Fraction of reactivity in control rod ($\Delta K$) | 4%. |

The operating characteristics of the reactor are as follows.

| | |
|---|---|
| Maximum power level | 2000 kw. |
| Average specific power, kw./kg. $U^{235}$ | 380. |
| Peak thermal flux in fuel | $5 \times 10^{12}$ n/cm.$^2$/sec. |
| Slurry temperature in | 700° F. (max.). |
| Slurry temperature out | 1100° F. (max.). |
| Maximum slurry velocity | 20 ft./sec. |
| Pressure drop across core | 10–12 lb./in.$^2$. |
| Flow rate (pounds per hour) | $3.4 \times 10^4$. |
| Heat generation rates, max./av. | 2.5. |

The primary heat exchanger data is as follows.

| | |
|---|---|
| Type | Shell and tube. |
| Secondary fluid | NaK. |
| Number of parallel slurry circuits | 25 (¼" tubes). |
| Flow rate | $3.4 \times 10^4$ lb./hr. |
| Heat flux in | $3 \times 10^5$ B.t.u./ft.$^2$/hr. |
| Feet of ¼" tubing | 1200. |
| Volume of slurry in heat exchanger | 200 in.$^3$. |
| Pressure drop | 20–30 lb./in.$^2$. |

The secondary heat exchanger has the following characteristics:

| | |
|---|---|
| Type | NaK to water. |
| Inlet (NaK) temperature | 1050° F. |
| Outlet (NaK) temperature | 580° F. |
| Steam conditions (superheated) | 1250 p.s.i.g., 850° F. |

The pumps have the following capacities:

| | G.p.m. |
|---|---|
| Electromagnetic | 300 |
| Canned rotor | 300 |
| Secondary D.C. electromagnetic | 300 |

The NaK alloy, both for the secondary circuit and for the slurry liquid are 50% by weight sodium and 50% by weight potassium metals, substantially free from the oxides.

A particular modification, in which the hollow block 20 is made of the now available high density graphite, and hermetically sealed envelope 22 of stainless steel is eliminated offers an additional advantage. The high density graphite which is highly pure carbon would not become radioactive on irradiation with neutrons. This would reduce shielding requirements, and allow the handling, storage, and disposal of this element without the normal precautions needed with its radioactive counterpart.

The reactor described in detail is only one embodiment of the present invention. Other moderators could be substituted, dimensions and slurry content changed. It is the intention of the applicants not to be limited by the specific embodiment but only within the scope of the appended claims.

What is claimed is:

1. A neutronic reactor comprising a spiral of metal tubing; a quantity of a slurry of a uranium compound dispersed in alkali metal contained in said spiral; an inner cylinder of moderating material closely conforming to the inner diameter of the spiral positioned therein; an outer hollow cylinder of moderating material whose inner diameter conforms to the outer diameter of said spiral positioned thereabout; control rods inserted into said inner cylinder and outer cylinder; means for actuating said control rods responsive to the neutron flux in the reactor; means for causing flow of the slurry; and means for removing heat from said slurry.

2. A neutronic reactor comprising a spiral of metal tubing; a quantity of a uranium ceramic compound dispersed in an alkali metal contained in said spiral; an inner cylinder of graphite closely conforming to the inner diameter of said spiral and enclosed therein; an outer hollow cylinder of graphite whose inner diameter conforms to the outer diameter of said spiral and encloses said spiral; control rods insertable into said cylinders; means for actuating the insertion of said control rods into said cylinders responsive to the neutron flux in the reactor; a heat exchanger; a pump; and a piping system completing a circuit from said reactor to said pump and said heat exchanger and returning to said reactor.

3. The reactor of claim 2 in which the uranium compound is $UO_2$ and the alkali metal is sodium-potassium alloy.

4. The reactor of claim 3 in which the uranium is enriched in the fissionable isotope $U^{235}$ to the extent of at least 20%.

No references cited.